US012129629B2

(12) United States Patent
Loisy et al.

(10) Patent No.: US 12,129,629 B2
(45) Date of Patent: Oct. 29, 2024

(54) METHOD AND SYSTEM TO SECURELY MANAGE QUICK COUPLING OF TOOLS IN AN EARTH MOVING EQUIPMENT

(71) Applicant: Volvo Construction Equipment AB, Eskilstuna (SE)

(72) Inventors: Pierre Loisy, Chambery (FR); Alain Oggero, Virignin (FR)

(73) Assignee: Volvo Construction Equipment AB, Eskilstuna (SE)

( * ) Notice: Subject to any disclaimer, the term of this patent is extended or adjusted under 35 U.S.C. 154(b) by 975 days.

(21) Appl. No.: 17/255,622

(22) PCT Filed: Jun. 27, 2018

(86) PCT No.: PCT/EP2018/067306
§ 371 (c)(1),
(2) Date: Dec. 23, 2020

(87) PCT Pub. No.: WO2020/001766
PCT Pub. Date: Jan. 2, 2020

(65) Prior Publication Data
US 2021/0270008 A1 Sep. 2, 2021

(51) Int. Cl.
*E02F 9/22* (2006.01)
*E02F 3/36* (2006.01)
(Continued)

(52) U.S. Cl.
CPC ............ *E02F 9/226* (2013.01); *E02F 3/3618* (2013.01); *E02F 3/3622* (2013.01);
(Continued)

(58) Field of Classification Search
CPC ....... E02F 3/3663; E02F 3/3622; E02F 9/226; F15B 20/00; F15B 2211/327;
(Continued)

(56) References Cited

U.S. PATENT DOCUMENTS 3,591,052 A * 7/1971 Nef ...................... B22D 39/023
222/64
3,943,992 A * 3/1976 Mezger .................. B22D 39/00
164/156.1
(Continued)

FOREIGN PATENT DOCUMENTS

WO 2012/085500 A9 6/2012
WO 2015/155232 A1 10/2015

OTHER PUBLICATIONS

International Search Report and Written Opinion for PCT/EP2018/067306, mailed Feb. 28, 2019, 9 pages.

*Primary Examiner* — Dustin T Nguyen
(74) *Attorney, Agent, or Firm* — Withrow & Terranova, PLLC

(57) ABSTRACT

A control device and method for controlling a disengaging actuator (1) of a tool attachment, the device comprising a three-state switch (2), with a middle neutral position (20), a first end position (21), and a second end position (22), a control unit (3, 3'), having an input corresponding to an activation of the first end position (21), an electro-valve (4) coupled hydraulically to the disengaging actuator (1), having a coil (40), a first control line (41) and a second control line (42) coupled respectively to first and second terminals of the coil (40) of the electro-valve, wherein one of the first and second control lines is coupled to the second end position (22) of the three-state switch and the other of the first and second control lines is coupled to an output of the control unit, such that both control lines have to be activated to allow disengagement.

15 Claims, 3 Drawing Sheets

(51) Int. Cl.
*E02F 9/24* (2006.01)
*E02F 9/26* (2006.01)
*F15B 20/00* (2006.01)

(52) U.S. Cl.
CPC .............. *E02F 3/3663* (2013.01); *E02F 9/24* (2013.01); *E02F 9/268* (2013.01); *F15B 20/00* (2013.01); *F15B 2211/327* (2013.01); *F15B 2211/6336* (2013.01); *F15B 2211/7053* (2013.01); *F15B 2211/85* (2013.01); *F15B 2211/862* (2013.01); *F15B 2211/863* (2013.01); *F15B 2211/8643* (2013.01); *F15B 2211/865* (2013.01); *F15B 2211/8752* (2013.01); *F15B 2211/8757* (2013.01)

(58) Field of Classification Search
CPC ...... F15B 2211/6336; F15B 2211/7053; F15B 2211/85; F15B 2211/862; F15B 2211/863; F15B 2211/8643; F15B 2211/865; F15B 2211/8752; F15B 2211/8757
See application file for complete search history.

(56) References Cited

U.S. PATENT DOCUMENTS

| | | | | | |
|---|---|---|---|---|---|
| 4,132,071 | A * | 1/1979 | Priese | F16K 31/02 60/903 |
| 6,135,230 | A * | 10/2000 | Schenck | B60K 28/04 180/269 |
| 7,367,256 | B2 * | 5/2008 | Fatemi | E02F 3/3663 91/1 |
| 7,429,796 | B2 * | 9/2008 | Abe | H01L 24/11 257/737 |
| 7,467,918 | B2 * | 12/2008 | Yao | E02F 3/3663 37/468 |
| 9,970,177 | B2 | 5/2018 | Koestler et al. | |
| 10,113,292 | B2 * | 10/2018 | Yokota | E02F 3/3663 |
| 10,394,215 | B2 * | 8/2019 | Li | E02F 9/24 |
| 11,105,063 | B2 * | 8/2021 | Sato | F15B 11/17 |
| 2004/0244575 | A1 | 12/2004 | Fatemi et al. | |
| 2013/0160441 | A1 * | 6/2013 | Yokohata | E02F 3/3663 60/431 |

* cited by examiner

METHOD AND SYSTEM TO SECURELY MANAGE QUICK COUPLING OF TOOLS IN AN EARTH MOVING EQUIPMENT

This application is a 35 USC 371 national phase filing of International Application No. PCT/EP2018/067306, filed Jun. 27, 2018, the disclosure of which is incorporated herein by reference in its entirety.

FIELD OF THE INVENTION

The present invention relates to methods and systems for securely managing quick coupling of tools in earth moving equipment. Tools attached to earth moving equipment can be buckets, hammers, or any accessory that can be attached to the distal end of the powered arm of the earth moving equipment. Earth moving equipment comprise in particular excavators and the like.

BACKGROUND OF THE DISCLOSURE

Construction machines, including excavators, are fitted with various optional devices or tools, including buckets, breakers, hammers, shears, dozer blades, etc., at the tip of the arm as a working device to accommodate the work required at the construction site. Typically, the optional device or 'tool' can be mounted to a quick coupler system which enables a quick replacement of one tool by another tool.

The quick coupler system is usually operated by hydraulic pressure. Most quick coupler systems comply with ISO standard ISO 13031.

Equipment manufacturers seek to decrease the likelihood of an incident or inadvertent event during the exchange phase of the tool, as taught for example by document WO2012085500.

The inventors have found that there remains a need to further improve the safety of such quick coupler systems.

SUMMARY OF THE DISCLOSURE

According to one aspect of the present invention, it is disclosed a control device for controlling a disengaging actuator of a tool attachment, the device comprising

- a three-state switch, with a middle neutral position, a first end position, and a second end position,
- a control unit, having an input corresponding to an activation of the first end position,
- a electro-valve coupled hydraulically to the disengaging actuator,
- a first control line and a second control line coupled respectively to first and second terminals of the coil of the electro-valve, wherein one of the first and second control lines is coupled to the second end position of the three-state switch and the other of the first and second control lines is coupled to an output of the control unit such that both control lines have to be activated to allow disengagement.

Thanks to these dispositions, first and second control lines are respectively controlled by channels having a different technology (hardwire versus logically controlled), thereby decreasing the risk of common mode failure.

We also note that, unlike the conventional art, none of the two terminals of the coil is permanently established (no permanent connection to positive supply or ground). Said otherwise, both terminals of the electro-valve coil are selectively controlled, not only one.

There is therefore provided functional and hardware protection against any single failure from hardware, software or operator; also most user misuse can be avoided.

Only a multiple point failures (at least two) can lead to undesirable event.

In the present disclosure, the term "control system" can also be used instead of "control device" since several physical units are involved.

Preferably, the first end position is biased toward the middle neutral position, said otherwise, the first end position is unstable (pushbutton like). Preferably, the term 'middle' about the neutral position means that the neutral position lies between the first and second end positions.

Here 'control lines' are electrical control lines; said electrical control lines are configured to energize the coil of the electro-valve for moving the plunger away from its rest position.

The proposed solution enhances safety integrity and resistance to faults of the arrangement of electro-hydraulic means used in the context of the quick coupler control function in excavators.

This decreases the likelihood of dependent failures to a minimal extent, and by that increases resistance to faults. The rejected faults are furthermore either caused by operator misuse or system failures.

In various embodiments of the invention, one may possibly have recourse in addition to one and/or other of the following arrangements, taken alone or in combination.

According to one possible option, the first control line is coupled to an output of the control unit.

According to one possible option, the first control line is energized when pulled to ground. Such electrical or electronic control stage, pulling to ground inside the control unit, turns out to be of good availability and cost effectiveness.

According to one possible option, the second control line is coupled to the second end position of the three-state switch.

According to one possible option, the second control line is energized when supplied by positive voltage. Thereby, since short circuits to ground appears more often than short circuits to positive voltage, the likelihood of controlling the second line in an inadvertent manner the second line is decreased.

According to one possible option, the control unit comprises a bi-stable relay. This is a sturdy, well known and reliable solution.

According to one possible option, the control unit comprises a solid state control stage to control the first control line. Protection is provided against short circuits.

According to one possible option, the control unit may comprise software. This configuration is more open to take into account auxiliary additional inputs or parameters in order to abort an ongoing quick change phase if necessary.

According to one possible option, the control device may further comprise at least one warning light (35,45), giving visual feedback and indications to the operator.

According to one possible option, the control device may comprise a first warning light controlled in parallel with one of the first and second control lines, and a second warning light controlled in parallel with the electro-valve. The first warning light notifies the user(s) about an ongoing quick coupling changing phase/sequence; whereas the second warning light notifies the user(s) about an ongoing disengagement of the disengaging actuator.

According to one possible option, the control device may further comprise an audio warning reflecting an ongoing quick change phase; this provides a good coverage for user warning whatever the stand/posture of the operator.

According to one possible option, the control device may further comprise an armrest position sensor and armrest position input at the control unit, such that an ongoing quick change phase is aborted whenever the armrest is raised. Advantageously, thanks to the position sensor and the logic attached to this information, whenever the operator goes out the machine cabin, the quick coupler changing phase is aborted According to one possible option, the three-state switch is arranged on a machine armrest. Thereby, the machine armrest has to be in the operative low position when starting a quick coupler changing phase; further, it is difficult, to manoeuver the three-state switch when the armrest is raised. When the armrest is raised, even if the three-state switch is actuated, this has no effect and does not start a changing sequence.

According to one preferred option, the second end position is stable and mechanically protected from direct actuation; this prevents inadvertent actuation of the second end position.

According to one possible option, there are provided an auxiliary knob interposed between two protective cheeks, and the auxiliary knob has to be actuated before allowing the toggling of the three-state switch to the second end position. Thereby, only an intentional action with the tip of a finger can lead to effective toggling to the second end position, achieving efficient misuse protection.

According to one preferred option, the electro-valve is a 4/2 valve. This is a reliable well known solution.

The present disclosure is also directed to an electro-hydraulic system comprising a hydraulic disengaging actuator, a hydraulic circuit with a pump and a control device as described above.

The present disclosure is also directed to a control method to be carried out in a device for controlling a disengaging actuator of a tool attachment, comprising a three-state switch, with a neutral position, a first end position, and a second end position, a control unit, a electro-valve coupled hydraulically to the disengaging actuator, a first control line and a second control line coupled respectively to first and second terminals of the coil of the electro-valve, the method comprising the following steps:

/a/ a first temporary actuation of the three-state switch to the first end position, causes a start/beginning of a quick coupler changing phase/sequence and causes the first control line to be energized and maintained in an energized state, accompanied with visible and audio warnings, /b/ a toggling of the three-state switch to the second end position, causes the second control line to be energized through the three-state switch, and causes the actuation of the electro-valve which in turn causes the actuation of the disengaging actuator, /c/ allowing the physical change of the tool/implement attached to the quick coupler attachment, (moving the excavator arm)

/d/ a toggling of the three-state switch back to the neutral position, causes at least the second control line to be de-activated, which causes the de-actuation of the electro-valve which in turn causes the re-engagement of the disengaging actuator, /e/ a second/further temporary actuation of the three-state switch to the first end position, causes a termination of the quick coupler changing phase.

The overall warnings (audio and visual) are cleared at step /e/.

We note here that instead of "quick coupler changing phase", the term "quick coupler changing sequence" can also be used.

According to one possible option, at step /e/, the second/further temporary actuation of the three-state switch to the first end position, further causes the first control line to be de-activated.

According to one possible option, the quick coupler changing phase is aborted whenever an armrest raised information is inputted.

According to one possible option, the control device has no time-out function, abortion is achieved by a specific action or condition, abortion also occurs in case of loss/interruption of electrical power supply.

BRIEF DESCRIPTION OF THE DRAWINGS

Other features and advantages of the invention appear from the following detailed description of one of its embodiments, given by way of non-limiting example, and with reference to the accompanying drawings, in which.

DETAILED DESCRIPTION OF THE DISCLOSURE

In the figures, the same references denote identical or similar elements. For the sake of clarity, some elements may not be represented at scale.

Figure 1:
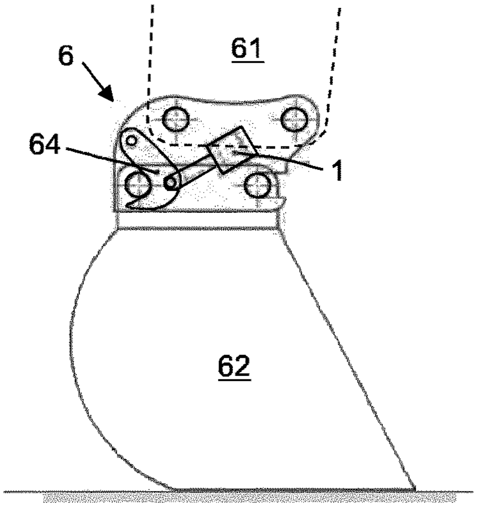
FIG. 1 illustrates a diagrammatic side view of a bucket attached with a quick coupling system to an arm of a machine.

As shown in FIG. 1, an earth moving equipment ('excavator' or 'machine' of this kind) comprises a working arm having a distal end 61. At the distal end of the working arm, there is provided a quick coupler system denoted 6. In the illustrated example the quick coupler system comprises strong pins attached to the distal ends and strong pins or hooks to carry a bucket 62 or the like. There are provided various types of quick coupler system as described in ISO standard 13031, as known per se.

In the context of the present invention, it has been illustrated a force locked engagement system with an engagement member denoted 64 and an actuator which is called in the following "disengagement actuator" (ref 1), since in the rest position, this actuator tends to push the engagement member in the secure locking state.

System Layout

Figure 2:
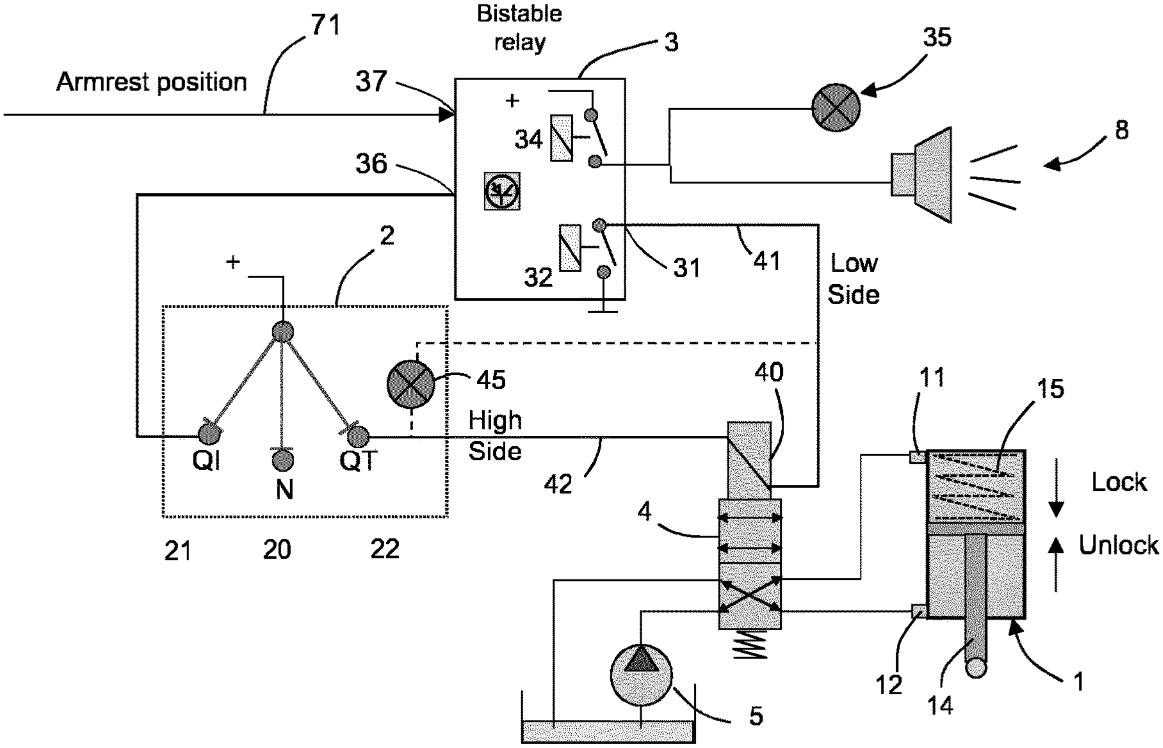
FIG. 2 is exemplary block diagram of a first embodiment of a control device according to the present invention.

As apparent from FIG. 2, the disengaging actuator 1 is such that its rest state corresponds to an engagement of the looking device to securely attach the tool to the machine arm 61.

The disengaging actuator 1 is here a double-acting hydraulic cylinder with a first port 11 and a second port 12.

For the purpose of the safe rest state, there is provided a spring 15 that pushes the rod 14 of the cylinder toward the locking state, even when no hydraulic pressure is available.

Besides the above-mentioned pump 5, there is provided a hydraulic tank and an electro-valve 4 between the pump 5 and the hydraulic cylinder.

According to the illustrated example, the electro-valve 4 is a 4/2 valve, i.e. with four ports, and two plunger positions. Here it is an ON/OFF valve. This kind of electro-valve has a control coil 40, a return spring to bias the plunger to a rest position. This kind of electro-valve is known per se thus not described in detail here.

However, alternate solutions for the electro-valve or the hydraulic circuit are also possible.

Further, when hydraulic pressure is available (hydraulic pump 5 is running), the default control by the hydraulic circuit is to supply hydraulic pressure through first port 11 in the chamber where the pushing spring is located. The rest position of the electro-valve corresponds to the locking state of the disengaging actuator.

Only when ad-hoc conditions are met to disengage the disengaging actuator 1, the plunger of the electro-valve 4 is to be controlled away from its rest position; when the coil 40 is energized, the plunger moves away from its rest position and, in this case only, the hydraulic pressure is supplied to the second port 12 of the hydraulic cylinder, whereas at the same time the first port 11 is connected to the tank. Under this condition, the rod 14 moves back and the quick coupler is unlocked, allowing physical exchange of tool.

As shown on FIG. 2, the control device comprises a three-state switch 2. The three-state switch comprises a middle neutral position 20 (lettered 'N'), a first end position 21 (lettered 'QI'), and a second end position 22 (lettered 'QT'). There is provided at least an electrical input supplying the three-state switch with positive voltage (12V or 24V according to the network voltage of the machine). There is provided a first electrical output corresponding to the first end position, coupled by an electrical link 43 or wire to the control unit. There is provided a second electrical output corresponding to the second end position, coupled by an electrical link 42 or wire to the electro-valve 4. The internal electrical layout can be as simple as represented at FIG. 2, or can be more elaborate with two independent electrical commutators for the same overall function.

Figure 8:
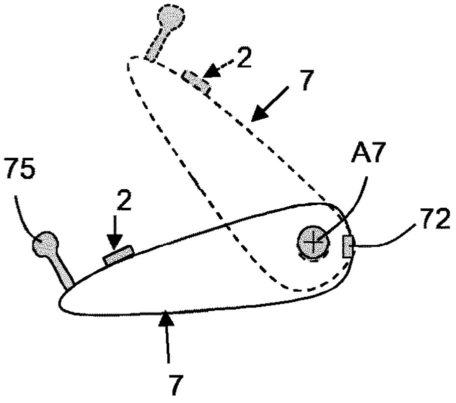
FIG. 8 illustrates an armrest of the earth moving equipment.

As illustrated on FIG. 8, the three-state switch 2 is arranged on a machine armrest 7. Besides, the armrest 7 comprises one or more joystick 75 or levers to controls the different actuators of the machine (arm, tool auxiliaries, etc, without excluding crawlers).

The control device comprises a first control line 41 a second control line 42 coupled respectively to first and second terminals of the coil 40 of the electro-valve.

The control device comprises a control unit 3. The control unit 3 has an input 36 corresponding to an activation of the first end position 21.

In the illustrated example, the first control line 41 is energized when pulled to ground, i.e. Low Side active. However we note that the contrary can also be possible.

In the illustrated example, the second control line 42 is energized when supplied by positive voltage (either 12V or 24V according to the onboard electrical network). However we note that the contrary can also be possible.

The first control line 41 is coupled to an output denoted 31 of the control unit.

The output 31 is driven by a relay 32 included in the control unit.

The control unit 3 comprises a bi-stable relay. A bi-stable relay is here a relay having a basic logic control, with a basic latch function, i.e. one impulse set the latch and a further impulse unset the latch.

In the illustrated example, the control device comprises a first warning light 35, reflecting an ongoing quick change phase. The first warning light 35 can be controlled in accordance with the logic on first control line.

In the illustrated example, the control device comprises a second warning light 45, reflecting a disengagement state of the disengaging actuator. The second warning light 45 can be controlled in accordance with the coil control.

One of the first and second warning light 35,45 can be located in the three-state switch 2.

In the illustrated example, the control device comprises an audio warning 8 reflecting an ongoing quick change phase.

The audio warning 8 can be any kind of beeper, buzzer. There may be one audio warning device inside the cabin of the machine. There may be one audio warning device outside the cabin.

There may be one warning light inside the cabin of the machine There may be arranged a turning light on the top of the cabin.

In the illustrated example, the warning devices give strong notice of an ongoing quick coupler changing sequence are driven by a separate relay 34. However they could also be driven from the output 31 controlling the first line.

In the illustrated example, the control device comprises an armrest position sensor 72 and armrest position input 71 such that an ongoing quick change phase is aborted whenever the armrest is raised.

Figure 3:
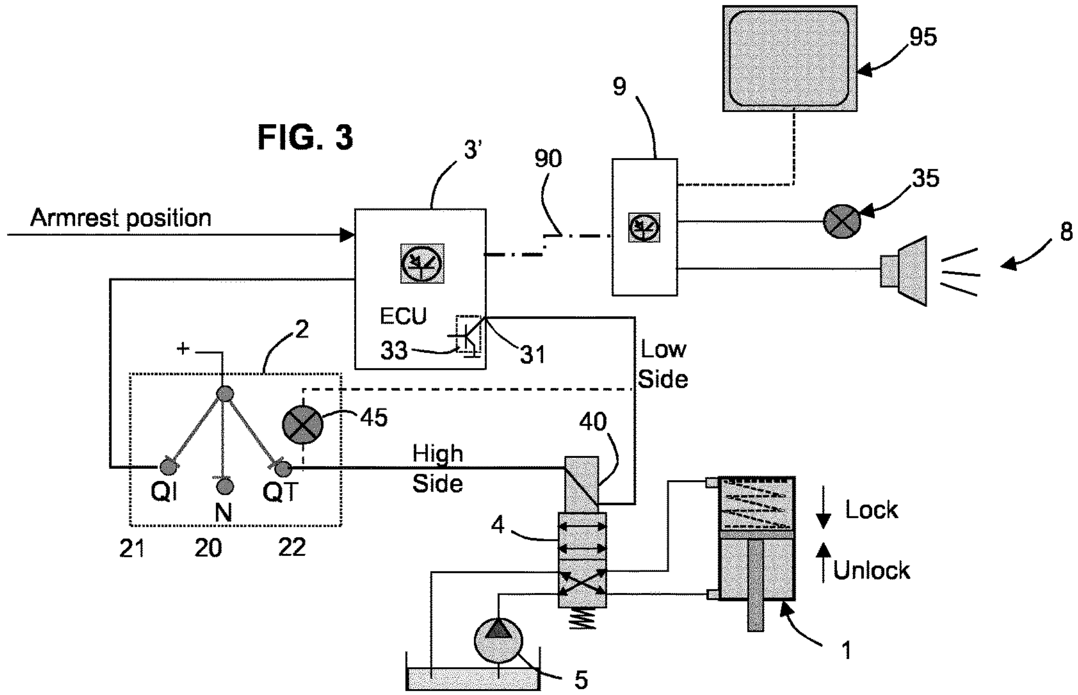
FIG. 3 is exemplary block diagram of a second a second embodiment of a control device according to the present invention.

As apparent from FIG. 3, the control unit 3' may comprise a communication capability via a serial bus 90 (CAN bus, LIN bus or any like solution). The control unit 3' may comprise a microcontroller. There may be provided a HMI screen 95 (HMI=Human Machine Interface) to provide a series of menu driven or sequence driven displays intended to help to the user.

Here, in the shown example, the control unit 3' comprises a solid state control stage 33 to control the first control line 41. However a controlled relay can also be considered. Here, in the shown example, the control unit 3' may comprise a smart FET (Field Effect Transistor) with a current sensing capability; this provides protection against short circuits and overheating.

Three-State Switch

Figure 5:
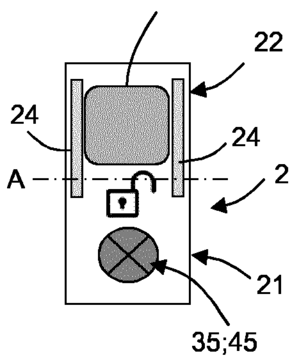
FIG. 5 illustrates one embodiment of the three-state switch.

FIG. 5 depicts the three-state switch 2 which comprises a base 29 and a rocker 28. One or more warning light 35; 45 already mentioned can be located in the three-state switch 2.

In the illustrated example here, the three-state switch 2 comprises an auxiliary knob 26 interposed between two protective cheeks 24. The auxiliary knob 26 provides protection against direct actuation by pushing the rocker 28. A known-per-se mechanical design inside the three-state switch 2 requires a prior actuation of the auxiliary knob 26 to release the rocking of the three-state switch 2 to the second end position 22

In other words, the auxiliary knob 26 has to be actuated before allowing the toggling of the three-state switch 2 to the second end position 22.

Figure 6A:
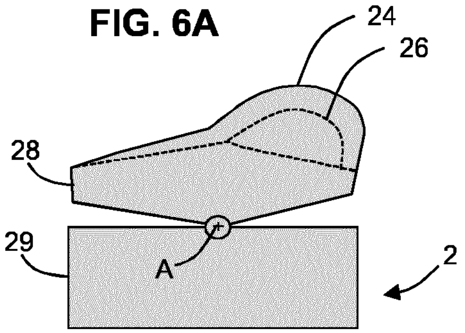
FIGS. 6A, 6B and 6C illustrate different states of the three-state switch.

FIG. 6A depicts the three-state switch 2 in the neutral position. The rocker 28 is in a middle stand between the two end positions that are described below.

Figure 6B:
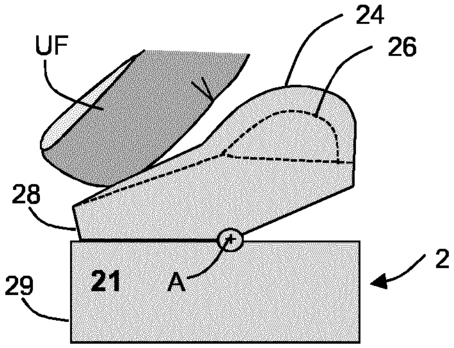

FIG. 6B depicts the three-state switch 2 in the first end position 21. The first end position is unstable (pushbutton like), the rocker 28 is biased to the neutral position by a spring. Only impulses are therefore achieved, stable state.

Figure 6C:
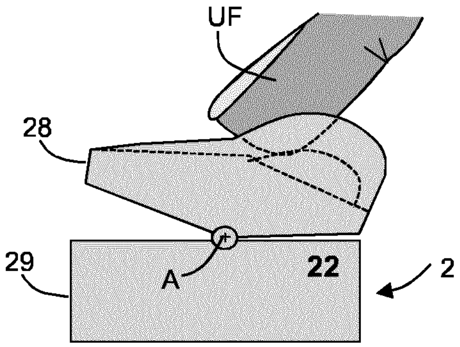

FIG. 6C depicts the three-state switch 2 in the second end position 22.

As apparent from FIG. 6C, only an intentional action with the tip of a finger UF can lead to effective toggling to the second end position 22, achieving efficient misuse protection.

The second end position is stable, and (with or without mechanical protection) changing from the second end position to the neutral position and vice-versa is called "toggling".

Control Method

Figure 4:
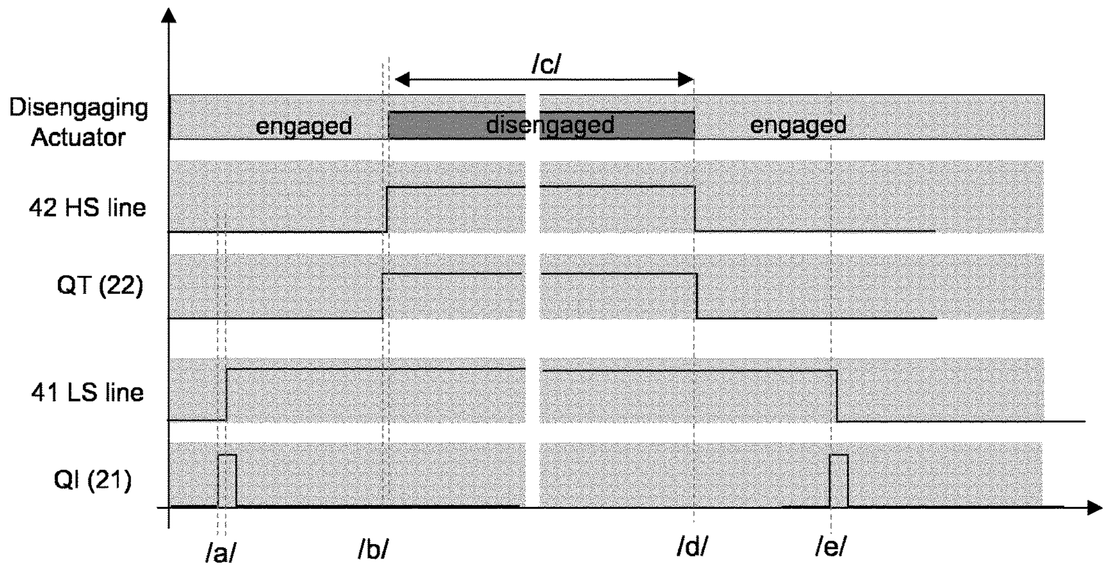
FIG. 4 illustrates a time chart of the method involved therein.

As illustrated on FIG. 4, the propose method comprises the following steps:

- Step /a/ a first temporary actuation of the three-state switch to the first end position 21, causes a start/beginning of a quick coupler changing phase/sequence and causes the first control line to be energized and maintained in an energized state, accompanied with visible and audio warnings,
- Step /b/: a toggling of the three-state switch to the second end position 22, causes the second control line to be energized through the three-state switch 2, and causes the actuation of the electro-valve 4 which in turn causes the actuation of the disengaging actuator 1,
- Step /c/: allowing the physical change of the tool/implement attached to the quick coupler attachment, here the operator uses the joystick 75 to disengage old tool, then moves the excavator arm to a new tool and engage the new tool.
- Step /d/: a toggling of the three-state switch back to the neutral position 20, causes at least the second control line to be de-activated, which causes the de-actuation of the electro-valve 4 which in turn causes the re-engagement of the disengaging actuator 1,
- Step /e/: a second/further temporary actuation of the three-state switch to the first end position 21, causes a termination of the quick coupler changing phase, and preferably in practice the second/further temporary actuation of the three-state switch to the first end position 21, causes the first control line to be de-activated.

At step /e/, preferably, audio and visual warnings are stopped, i.e. stated otherwise, the overall warnings (audio and visual) are cleared.

In one embodiment, the control device has no time-out function, abortion of the quick coupler changing phase is achieved only by a specific action on the three-state switch 2.

According to a preferred variant, the quick coupler changing phase is also aborted whenever an armrest raised information 71 is inputted at the control unit.

Further, abortion also occurs in case of loss/interruption of electrical power supply.

We note here that a quick coupler changing phase abortion by a second/further temporary actuation of the three-state switch to the first end position 21 can occur during step /c/.

It should be noted that when the quick coupler changing phase is still active (before step /e /) steps /b/, /c/ and /d/ can be repeated a second time; this can happen if the operator realizes that the coupling is not correct, the operator can trigger again disengagement to correct the excavator arm position with regard to the bucket position.

The skilled person understand that, advantageously, only a predetermined sequence intentionally performed by an operator can allow tool disengagement.

If, for instance, the three-state switch is moved to the second end position 22 without having first move it to the first end position 21, then the first control line 41 remains not energized. As a result, even though the second line 42 is energized, no current flow in the coil 40 and the plunger of the electro-valve remains in the safe rest position. When the quick coupler changing phase has not been initiated properly, there is no risk of undesirable event.

According to another example, if the three-state switch 2 has been moved to the second end position 22 before the legal operator took control of the machine, for example another person has tampered the controls of the machine (intentionally or not), the same result occurs even though the second line 42 is energized, no current flow in the coil 40 and the plunger of the electro-valve remains in the safe rest position since the quick coupler changing phase has not been initiated properly.

Miscellaneous

Figure 7:
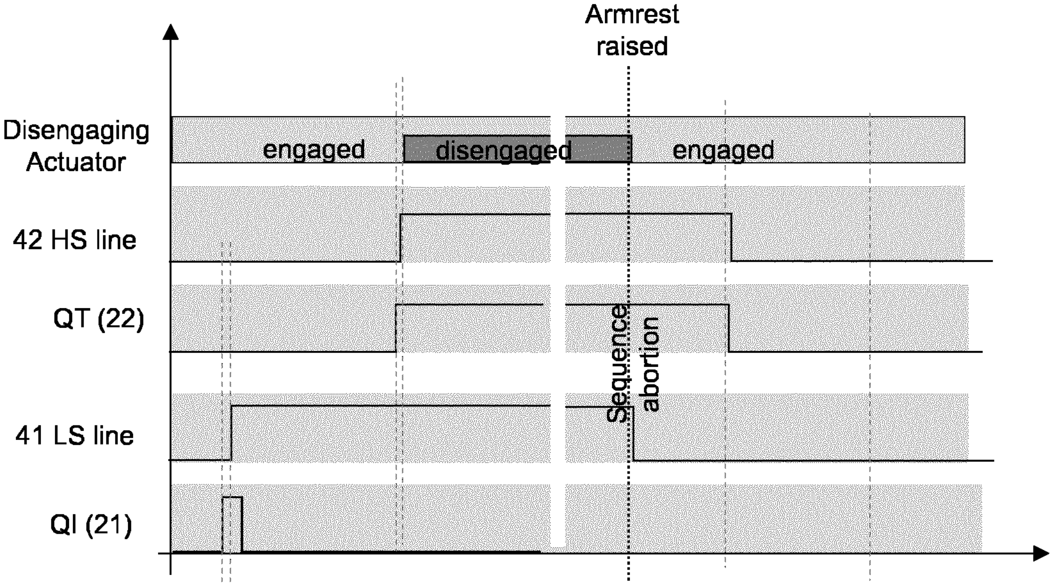
FIG. 7 illustrates another time chart of the method involved therein.

FIG. 7 shows that an armrest raise interrupts the supply of the first control line 41, and therefore the disengaging actuator 1 is re-engaged. Also, it is noted that an armrest raised condition prevents a sequence o be initiated even though the three-state switch is actuated.

In an alternative embodiment, the first control line can be energized by positive supply (High side) and the second control line can be energized when pulled to ground (Low side).

The proposed configuration of control device and associated method is validated according to ISO13849-2:2012.

The visual warning lights can include with one or more Leds.

There may be provided a diagnosis function of the three-state switch; a three-state switch with a double stage can be used such that the control circuit 3,3' can detect various failures: open circuit, short circuit to ground, short circuit to positive supply.

The invention claimed is:

1. A control device for controlling a disengaging actuator of a tool attachment, the device comprising:
   - a three-state switch, with a middle neutral position, a first end position, and a second end position;
   - a control unit, having an input corresponding to an activation of the first end position;
   - an electro-valve coupled hydraulically to the disengaging actuator, having a coil; and
   - a first control line and a second control line coupled respectively to first and second terminals of the coil of the electro-valve;
   - wherein one of the first and second control lines is coupled to the second end position of the three-state switch and the other of the first and second control lines is coupled to an output of the control unit, such that both control lines have to be activated to allow disengagement.

2. The device of claim 1, wherein the first control line is coupled to an output of the control unit.

3. The device of claim 2, wherein the second control line is coupled to the second end position of the three-state switch.

4. The device of claim 1, further comprising at least a warning light.

5. The device of claim 1, comprising a first warning light controlled in parallel with one of the first and second control lines, and a second warning light controlled in parallel with the electro-valve.

6. The device of claim 1, further comprising at least an audio warning.

7. The device of claim 1, further comprising an armrest position sensor and armrest position input at the control unit.

8. The device of claim 1, wherein the three-state switch is arranged on a machine armrest.

9. The device of claim 1, wherein the second end position is stable and mechanically protected from direct actuation.

10. The device of claim 1, wherein the electro-valve is a 4/2 valve.

11. An electro-hydraulic system comprising a hydraulic disengaging actuator, a hydraulic circuit with a pump and a control device, the control device comprising:

a three-state switch, with a middle neutral position, a first end position, and a second end position;

a control unit, having an input corresponding to an activation of the first end position;

an electro-valve coupled hydraulically to the disengaging actuator, having a coil; and a first control line and a second control line coupled respectively to first and second terminals of the coil of the electro-valve;

wherein one of the first and second control lines is coupled to the second end position of the three-state switch and the other of the first and second control lines is coupled to an output of the control unit, such that both control lines have to be activated to allow disengagement.

12. A control method to be carried out in a device for controlling a disengaging actuator of a tool attachment, comprising:

a first temporary actuation, by input of a control unit, of a three-state switch to a first end position, causes a start of a quick coupler changing phase and causes a first control line to be energized and maintained in an energized state, accompanied with visible and audio warnings, the first control line coupled to a first terminal of a coil of the electro-valve;

a toggling of the three-state switch to a second end position, causes a second control line to be energized through the three-state switch, and causes actuation of an electro-valve which in tum causes the actuation of the disengaging actuator, the electro-valve coupled hydraulically to the disengaging actuator, the second control line coupled to a second terminal of the coil of the elector-valve;

allowing the physical change of the tool attached to the quick coupler attachment, including moving an excavator arm;

a toggling of the three-state switch back to a neutral position, causes at least the second control line to be de-activated, which causes the de-actuation of the electro-valve which in tum causes there-engagement of the disengaging actuator; and a second temporary actuation of the three-state switch to the first end position, causes a termination of the quick coupler changing phase.

13. The method of claim 12, wherein the second temporary actuation of the three-state switch to the first end position, further causes the first control line to be deactivated.

14. The method of claim 12, wherein the audio and visual warnings are cleared at the second temporary actuation step.

15. The method of claim 12, wherein the quick coupler changing phase is aborted whenever an armrest raised information is inputted at the control unit.

* * * * *